US012675316B2

(12) United States Patent
Aronovich et al.

(10) Patent No.: US 12,675,316 B2
(45) Date of Patent: Jul. 7, 2026

(54) USING MULTIPLE QUOTA TREES IN RESOURCE SCHEDULING

(71) Applicant: International Business Machines Corporation, Armonk, NY (US)

(72) Inventors: Lior Aronovich, Thornhill (CA); Alaa S. Youssef, Valhalla, NY (US); Asser Nasreldin Tantawi, Somers, NY (US); Diana Jeanne Arroyo, Austin, TX (US); Marius Ion Danciu, Cluj-Napoca (RO)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 558 days.

(21) Appl. No.: 17/647,051

(22) Filed: Jan. 5, 2022

(65) Prior Publication Data

US 2023/0214257 A1     Jul. 6, 2023

(51) Int. Cl.
*G06F 9/48* (2006.01)
*G06F 9/50* (2006.01)
*G06F 16/901* (2019.01)

(52) U.S. Cl.
CPC .......... *G06F 9/4881* (2013.01); *G06F 9/5044* (2013.01); *G06F 16/9027* (2019.01)

(58) Field of Classification Search
CPC .. G06F 9/4881; G06F 9/5044; G06F 16/9027; G06F 9/505; G06F 2209/5021; G06F 9/5027; G06F 2209/504; G06F 9/5038; G06F 9/502
See application file for complete search history.

(56) References Cited

U.S. PATENT DOCUMENTS

| | | | |
|---|---|---|---|
| 7,716,275 B1 | 5/2010 | Nagaralu et al. | |
| 8,515,904 B1 * | 8/2013 | Dwyer, III .......... | G06F 16/1827 |
| | | | 711/112 |
| 9,201,693 B2 | 12/2015 | Fuller et al. | |
| 9,519,653 B2 | 12/2016 | Brand | |
| 9,984,037 B1 * | 5/2018 | Kavipurapu .......... | G06F 9/4881 |
| 10,037,341 B1 * | 7/2018 | Bassov ............... | G06F 16/185 |
| 10,067,940 B2 | 9/2018 | Chhaunker et al. | |

(Continued)

FOREIGN PATENT DOCUMENTS

| | | |
|---|---|---|
| CN | 109739480 A | 5/2019 |
| CN | 110764899 A | 2/2020 |

OTHER PUBLICATIONS

Wicklin, Rick, "Short-circuit Evaluation and Logical Ligatures in SAS", Aug. 14, 2019, SAS Institute Inc. (Year: 2019).*

(Continued)

*Primary Examiner* — Bradley A Teets
*Assistant Examiner* — Ari F Riggins
(74) *Attorney, Agent, or Firm* — Amin, Turocy & Watson, LLP

(57) ABSTRACT

Systems, computer-implemented methods, and computer program products to facilitate using multiple quota trees in resource scheduling are provided. According to an embodiment, a system can comprise a processor that executes computer executable components stored in memory. The computer executable components comprise an evaluation component that executes admissibility of a job request based on a scope property of one or more quota trees that apply to the job request.

20 Claims, 10 Drawing Sheets

(56) References Cited

U.S. PATENT DOCUMENTS

| | | | |
|---|---|---|---|
| 10,110,506 | B2 | 10/2018 | Kasso et al. |
| 10,218,569 | B2 | 2/2019 | Vano Newman |
| 10,805,237 | B2 | 10/2020 | Dettori et al. |
| 2011/0149737 | A1* | 6/2011 | Muthiah ............. H04L 67/1025 |
| | | | 370/235 |
| 2015/0269511 | A1 | 9/2015 | Busayarat et al. |
| 2015/0372881 | A1* | 12/2015 | Bellomo ............. H04L 41/5054 |
| | | | 709/226 |
| 2018/0024892 | A1 | 1/2018 | Mutha et al. |
| 2020/0192713 | A1* | 6/2020 | Wang .................... G06F 9/5061 |
| 2021/0042165 | A1 | 2/2021 | Rushton |
| 2021/0365290 | A1* | 11/2021 | Zhang .................... G06F 9/547 |

OTHER PUBLICATIONS

Mell et al., "The NIST Definition of Cloud Computing," Recommendations of the National Institute of Standards and Technology, NIST Special Publication 800-145, Sep. 2011, 7 pages.

* cited by examiner

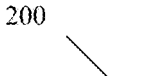
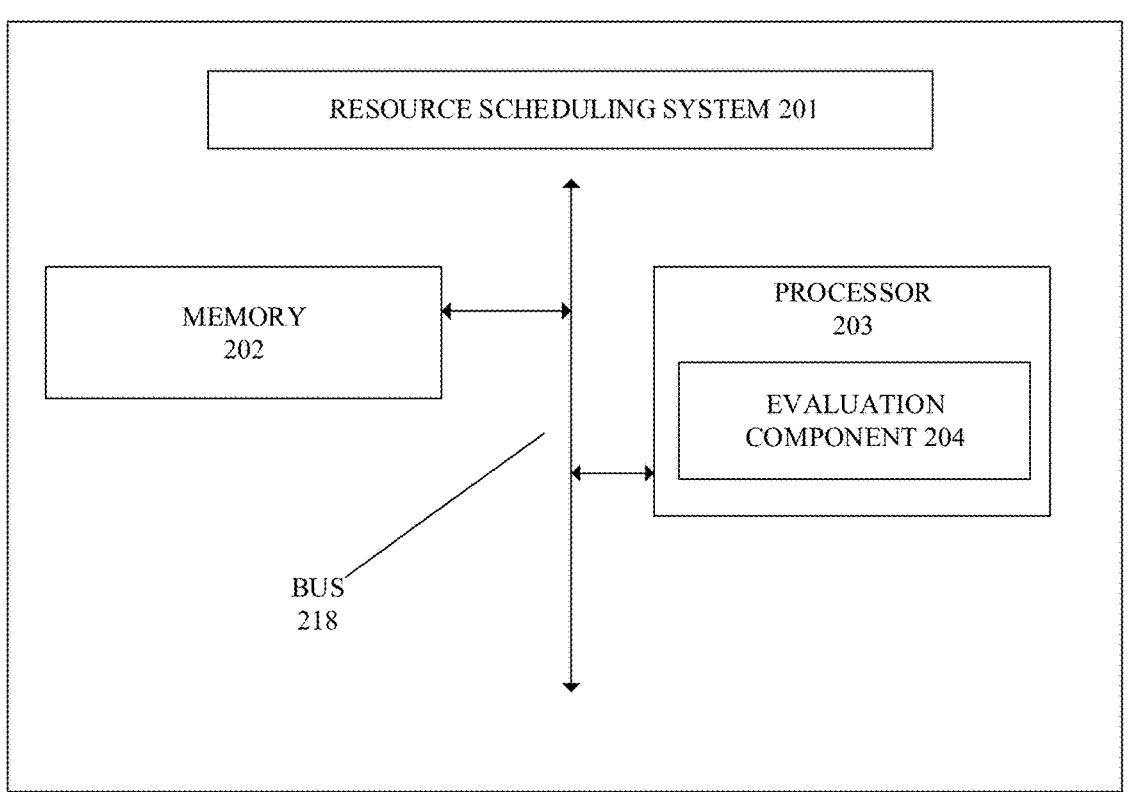
FIG. 2

300

RESOURCE SCHEDULING SYSTEM 201

MEMORY
202

BUS
218

PROCESSOR
203

EVALUATION
COMPONENT 204

MAPPING COMPONENT
305

LOGICAL OPERATIONS
COMPONENT 306

ARRANGEMENT
COMPONENT 307

SCHEDULING
COMPONENT 308

400

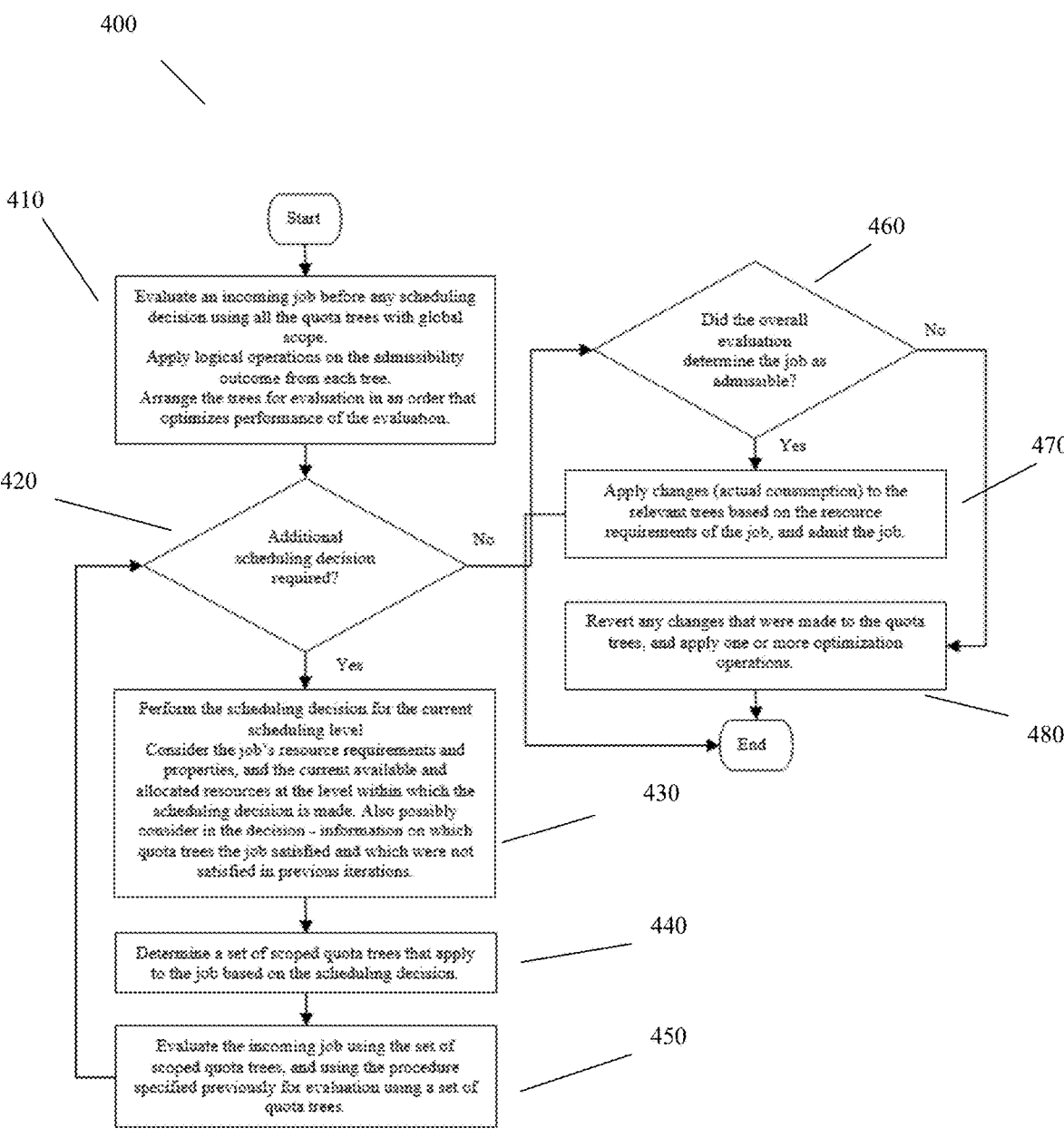

410

Start

Evaluate an incoming job before any scheduling decision using all the quota trees with global scope.
Apply logical operations on the admissibility outcome from each tree.
Arrange the trees for evaluation in an order that optimizes performance of the evaluation.

420

Additional scheduling decision required?

No

460

Did the overall evaluation determine the job as admissible?

No

Yes

470

Apply changes (actual consumption) to the relevant trees based on the resource requirements of the job, and admit the job.

Revert any changes that were made to the quota trees, and apply one or more optimization operations.

480

End

430

Yes

Perform the scheduling decision for the current scheduling level
Consider the job's resource requirements and properties, and the current available and allocated resources at the level within which the scheduling decision is made. Also possibly consider in the decision – information on which quota trees the job satisfied and which were not satisfied in previous iterations.

440

Determine a set of scoped quota trees that apply to the job based on the scheduling decision.

450

Evaluate the incoming job using the set of scoped quota trees, and using the procedure specified previously for evaluation using a set of quota trees.

Mapping, by a system, a job request to one or more leaf nodes in one or more quota trees.

Evaluating, by the system, admissibility of a job request based on a scope property of one or more quota trees that apply to the job request.

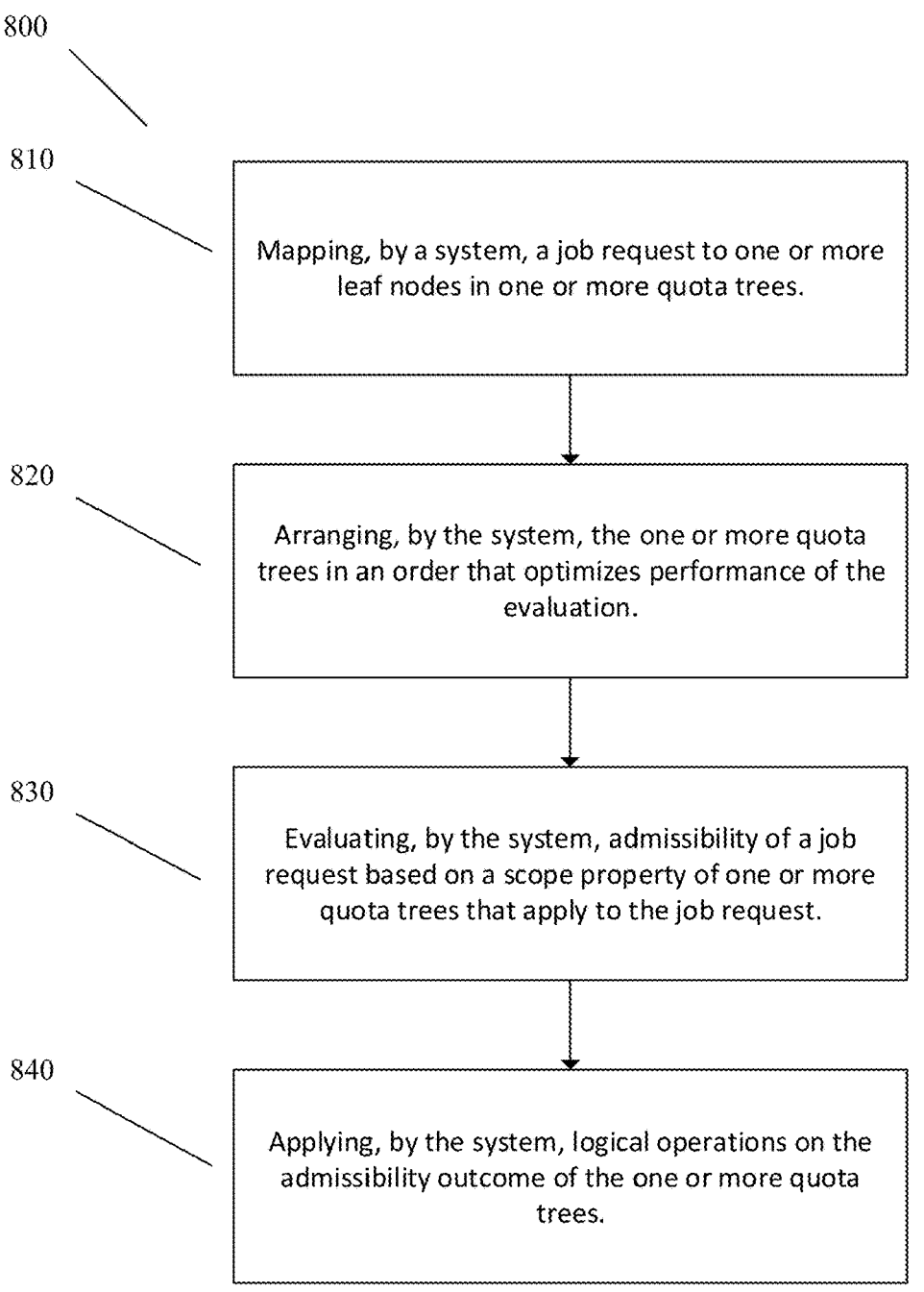

800

810

Mapping, by a system, a job request to one or more leaf nodes in one or more quota trees.

820

Arranging, by the system, the one or more quota trees in an order that optimizes performance of the evaluation.

830

Evaluating, by the system, admissibility of a job request based on a scope property of one or more quota trees that apply to the job request.

840

Applying, by the system, logical operations on the admissibility outcome of the one or more quota trees.

FIG. 8

USING MULTIPLE QUOTA TREES IN RESOURCE SCHEDULING

BACKGROUND

The subject disclosure relates to resource scheduling, and more specifically, using multiple quota trees in a resource scheduling system.

Use of cloud computing has great potential to address a variety of problems in a number of different domains. For example, cloud computing allows for a user or multiple users to utilize the power of computing systems without awareness of their implementation details. Efficient sharing of computing systems among users can be achieved through the use of resource scheduling, that may also define quota limits on resource usage in order to prevent resource requests from exceeding their respective quota limits and thereby negatively impacting the ability of the computing system to service other job requests.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate usage of multiple quota trees in resource scheduling are described.

According to an embodiment, a system can comprise a processor that executes computer executable components stored in memory. The computer executable components comprise an evaluation component that evaluates admissibility of a job request based on a scope property of one or more quota trees that apply to the job request. An advantage of such a system is that it enables multiple hierarchies to be considered as part of an admissibility evaluation.

In some embodiments, the computer executable components further comprise a mapping component that maps the job request to one or more leaf nodes in one or more quota trees. An advantage of such a system is that it enables the system to determine what quota trees apply to the job request.

According to another embodiment, a computer-implemented method can comprise evaluating, by a system operatively coupled to a processor, admissibility of a job request based on a scope property of one or more quota trees that apply to the job request. An advantage of such a computer-implemented method is that it enables multiple hierarchies to be considered as part of an admissibility evaluation.

In some embodiments, the above computer-implemented method can further comprise mapping, by the system, the job request to one or more leaf nodes in one or more quota trees. An advantage of such a computer-implemented method is that it can determine what quota trees apply to the job request.

According to another embodiment, a computer program product comprising a computer readable storage medium having program instructions embodied therewith, the program instructions executable by a processor to cause the processor to evaluate the admissibility of a job request based on a scope property of one or more quota trees that apply to the job request. An advantage of such a computer program product is that it enables multiple hierarchies to be considered as part of an admissibility evaluation.

In some embodiments, the program instructions are further executable by the processor to cause the processor to map the job request to one or more leaf nodes in one or more quota trees. An advantage of such a computer program product is that it can determine what quota trees apply to the job request.

DESCRIPTION OF THE DRAWINGS

FIG. 2 illustrates a block diagram of an example, non-limiting system that can facilitate usage of multiple quota trees in resource scheduling in accordance with one or more embodiments described herein.

FIG. 4 illustrates a flow diagram of an example, non-limiting computer-implemented method that can facilitate usage of multiple quota trees in resource scheduling in accordance with one or more embodiments described herein.

FIG. 8 illustrates a flow diagram of an example, non-limiting computer-implemented method that can facilitate usage of multiple quota trees in resource scheduling in accordance with one or more embodiments described herein.

DETAILED DESCRIPTION

Figure 1:
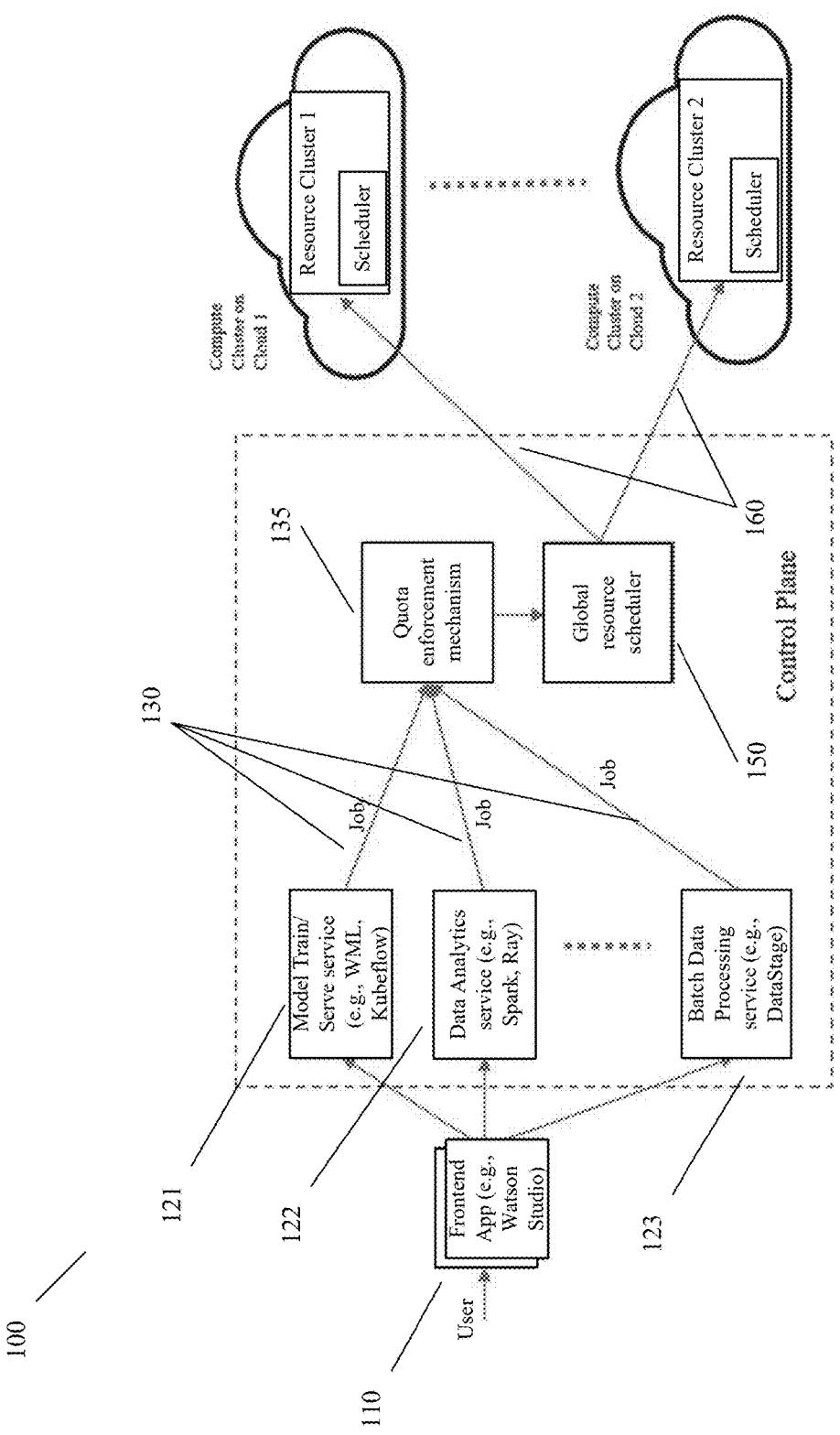
FIG. 1 illustrates a flow diagram of an example, non-limiting method that can facilitate receiving a job request for a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A problem with existing resource scheduling systems is that they can utilize only a single quota tree during the scheduling process, which in turn limits the granularity at which resource quotas can be configured and examined in order to facilitate resource scheduling.

Given problems described above with existing resource scheduling technologies, the present disclosure can be implemented to produce a solution to these problems in the form of systems, computer-implemented methods, and/or computer program products that can facilitate usage of multiple quota trees in resource scheduling by: evaluating admissibility of a job request based on a scope property of one or more quota trees that apply to the job request. An advantage of such system, computer-implemented methods, and/or computer program products is that they can be implemented to utilize multiple quota trees in resource scheduling, thereby enabling resource scheduling at a finer granularity.

In some embodiments, the present disclosure can be implemented to produce a solution to the problems described above in the form of systems, computer-implemented methods, and/or computer program products that can further facilitate usage of multiple quota trees in resource scheduling by: mapping the job request to one or more quota trees. An advantage of such systems, computer-implemented methods, and/or computer program products is that they can be implemented to determine multiple quota trees that apply to a job request.

In a shared cloud system used by multiple users, enforcing quota limits on user's resource consumption is typically used to ensure effective performance and quality of service for the plurality of users. In some embodiments, a shared cloud system can comprise of multiple clusters of resources obtained from potentially multiple providers. Quota limits can be defined to apply in different contexts, also referred to as scope properties. For example, global quota limits can apply to users' overall resource consumption regardless of from which resource cluster these resources are obtained. In another example, local quota limits can apply to users' resource consumption from specific resource groups, specific resource clusters, and/or specific cloud platforms. Furthermore, service oriented quota limits can apply limits on the resource consumption of specific services, or on users' resource consumption from specific services, either globally or locally. Examples of such services can include: AI model training and serving services, big data analytics services, and others.

In order to express hierarchies of limits, quota limits can be represented as quota trees, wherein the limits and actual consumption values specified for a parent node encompass the limits and actual consumption values specified for all its descendent nodes. As such, multiple hierarchies can be defined to be considered simultaneously. For example, hierarchies can represent organizational hierarchies, such as user groups, departments, divisions, organizational functions, projects, funding units etc., while other hierarchies can represent technical hierarchies, such as computer services, resource groups, data centers, etc. Quota limits can be defined to express limits for multiple resource types such as a computer processing unit, a graphical processing unit, a memory unit, a storage unit, and/or other computer resource types. Quota limits can also be permitted to express borrowing operations between sibling nodes and/or between a node and its parent node.

In order to enforce quota limits, a system, such as systems 200 and 300 described in greater detail below, can accept a configuration of multiple quota limit hierarchies as specified above and given an incoming job request, determine if the job request is admissible, based on the job request's properties and resource requirements, and based on all the quota limits that apply to the job request in all quota limit hierarchies that apply to the job request. Such a system would typically be included in a control plane of a cloud based system, and can, for example, intermediate between services that generate job requests and resource clusters. Namely, in a first step, an incoming job request can be checked using a quota enforcement mechanism to determine admissibility, and if admissible, in a next step the job request is forwarded to a layered resource scheduling mechanism for processing.

FIG. 1 illustrates a flow diagram 100 of an example, non-limiting method that can facilitate receiving a job request for a cloud computing environment in accordance with one or more embodiments described herein.

As shown, at 110 a user can request to use a service within a cloud computing system through an application. For example, a user may use an application that triggers the use of a service within the cloud based system such as services 121, 122, and/or 123.

At 130, a service, such as services 121, 122, and/or 123 can send a job request, to be performed with cloud resources, to a quota enforcement mechanism 135 which can determine admissibility of the job request.

At 140, the quota enforcement mechanism 135 can pass an admissible job request to a global resource scheduler 150.

At 160, the global resource scheduler 150 can signal a resource cluster to perform the job request based on what resources the job request will use and what resources are available to perform the job request.

Figure 3:
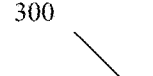
FIG. 3 illustrates a block diagram of an example, non-limiting system that can facilitate usage of multiple quota trees in resource scheduling in accordance with one or more embodiments described herein.

FIGS. 2 and 3 illustrates block diagrams of example, non-limiting systems 200 and 300, respectively, that can facilitate usage of multiple quota trees in resource scheduling. System 200 can comprise resource scheduling system 201. Resource scheduling system 201 of system 200 can comprise a memory 202, a processor 203, an evaluation component 204, and/or a bus 218. Resource scheduling system 201 of system 300 depicted in FIG. 3 can further comprise, a mapping component 305, a logical operations component 306, arrangement component 307, and/or a scheduling component 308.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, system 300 and/or resource scheduling system 201 can further comprise various computer and/or computing-based elements described herein with reference to operating environment 900 and FIG. 9. In several embodiments, such computer and/or computing-based elements can be used in connection with implementing one or more of the systems, devices, components, and/or computer-implemented operations shown and described in connection with FIG. 1, FIG. 2, FIG. 3 and/or other figures disclosed herein.

Memory 202 can store one or more computer and/or machine readable, writable, and/or executable components and/or instructions that, when executed by processor 203 (e.g., a classical processor, a quantum processor, and/or another type of processor), can facilitate performance of operations defined by the executable component(s) and/or instruction(s). For example, memory 202 can store computer and/or machine readable, writable, and/or executable components and/or instructions that, when executed by processor 203, can facilitate execution of the various functions described herein relating to resource scheduling system 201, evaluation component 204, mapping component 305, logical operations component 306, arrangement component 307, and/or another component associated with resource scheduling system 201.

Memory 202 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 202 are described below with reference to system memory 916 and FIG. 9. Such examples of memory 202 can be employed to implement any embodiments of the subject disclosure.

Processor 203 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 202. For example, processor 203 can perform various operations that can be specified by such computer and/or machine readable, writable, and/or executable components and/or instructions including, but not limited to, logic, control, input/output (I/O), arithmetic, and/or the like. In some embodiments, processor 203 can comprise one or more central processing unit, multi-core processor, microprocessor, dual microprocessors, microcontroller, System on a Chip (SOC), array processor, vector processor, quantum processor, and/or another type of processor. Further examples of processor 203 are described below with reference to processing unit 914 and FIG. 9. Such examples of processor 203 can be employed to implement any embodiments of the subject disclosure.

Resource scheduling system 201, memory 202, processor 203, evaluation component 204, mapping component 305, logical operations component 306, arrangement component 307, and/or another component of resource scheduling system 201 as described herein can be communicatively, electrically, operatively, and/or optically coupled to one another via bus 218 to perform functions of system 100, system 200, system 300, resource scheduling system 201, and/or any components coupled therewith. Bus 218 can comprise one or more memory bus, memory controller, peripheral bus, external bus, local bus, a quantum bus, and/or another type of bus that can employ various bus architectures. Further examples of bus 218 are described below with reference to system bus 918 and FIG. 9. Such examples of bus 218 can be employed to implement any embodiments of the subject disclosure.

Resource scheduling system 201 can comprise any type of component, machine, device, facility, apparatus, and/or instrument that comprises a processor and/or can be capable of effective and/or operative communication with a wired and/or wireless network. All such embodiments are envisioned. For example, resource scheduling system 201 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Resource scheduling system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, resource scheduling system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, resource scheduling system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Resource scheduling system 201 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, resource scheduling system 201 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between resource scheduling system 201 and external systems, sources, and/or devices (e.g., computing devices, communication devices, and/or another type of external system, source, and/or device).

Resource scheduling system 201 can comprise one or more computer and/or machine readable, writable, and/or executable components and/or instructions that, when executed by processor 203 (e.g., a classical processor, a quantum processor, and/or another type of processor), can facilitate performance of operations defined by such component(s) and/or instruction(s). Further, in numerous embodiments, any component associated with resource scheduling system 201, as described herein with or without reference to the various figures of the subject disclosure, can comprise one or more computer and/or machine readable, writable, and/or executable components and/or instructions that, when executed by processor 203, can facilitate performance of operations defined by such component(s) and/or instruction(s). For example, evaluation component 204, mapping component 305, logical operations component 306, arrangement component 307, and/or any other components associated with resource scheduling system 201 as disclosed herein (e.g., communicatively, electronically, operatively, and/or optically coupled with and/or employed by resource scheduling system 201), can comprise such computer and/or machine readable, writable, and/or executable component(s) and/or instruction(s). Consequently, according to numerous embodiments, resource scheduling system 201 and/or any components associated therewith as disclosed herein, can employ processor 203 to execute such computer and/or machine readable, writable, and/or executable component(s) and/or instruction(s) to facilitate performance of one or more operations described herein with reference to resource scheduling system 201 and/or any such components associated therewith.

Resource scheduling system 201 can facilitate (e.g., via processor 203) performance of operations executed by and/or associated with evaluation component 204, mapping component 305, logical operations component 306, arrangement component 307, and/or another component associated with resource scheduling system 201 as disclosed herein. For example, as described in detail below, resource scheduling system 201 can facilitate (e.g., via processor 203): evaluating admissibility of a job request based on a scope property of one or more quota trees that apply to the job request. In another example, as described in detail below, resource scheduling system 201 can further facilitate (e.g., via processor 203): mapping the job request to one or more leaf nodes in one or more quota trees; applying logical operations on the admissibility outcomes of the one or more quota trees; and/or arranging the one or more quota trees in an order that optimizes performance of the evaluation.

Evaluation component 204 can evaluate the admissibility of a job request based on a scope property of one or more quota trees that apply to the job request. For example, a job request can map to multiple paths in a quota tree, potentially with different resource requirement proportions for each path. For example, a job request is admissible with respect to a quota tree if the job request is admissible with respect to all the paths from the leaf nodes the job request is mapped to, to the root of the quota tree. Furthermore, a job request is admissible with respect to a specific path in the quota tree if adding the resource consumption of the job request to all the nodes on the path from the leaf node to the root does not exceed the limits specified on all the nodes on the path. In an embodiment, evaluation component 204 can evaluate the admissibility of a job request based on one or more quota trees that apply to the job request wherein the one or more quota trees are selected based on a global scope property. For example, evaluation component 204 can receive a list of quota trees that apply to the job request based on the scope of the quota trees. As such, if the job request calls for processor operations with a certain scope, then all quota tree expressing processor operation limits within that scope would apply to the job request. As such, evaluation component 204 can then check if the resource usage requested by the job request is greater than the resource limit and/or available resources. For example, evaluation component 204 can first determine if the job request's resource usage is less than or equal to the limit specified by the one or more leaf nodes in the one or more quota trees which the job request is mapped to. For example, if a job request calls for 100 processor computations, but the quota tree for processor computations has a limit of 90 processor computations at the leaf node the job request is mapped to, then evaluation component can determine that the job request is not admissible on the quota tree for processor computations. Evaluation component 204 can perform this evaluation process on each quota tree that applies to the job request based on the scope properties of the quota trees. In an embodiment, evaluation component 204 can determine admissibility for all quota trees that apply to the job request with a global scope. In another embodiment, evaluation component 204 can determine admissibility of the job request on quota trees with a non-global scope. For example, as described in greater detail below, evaluation component 204 can determine admissibility of one or more quota trees with a local scope iteratively, wherein evaluation component 204 determines admissibility on a quota tree with broad scope before iterating to determine admissibility on a quota tree with narrower scope. In an embodiment, evaluation component 204 can also determine admissibility of the one or more quota trees based on available resources within the one or more quota trees. For example, evaluation component 204 can determine available resources of a quota tree by determining the difference between the limit of the leaf node of the quota tree the job request is mapped to and the actual consumption of resources in the leaf node of the quota tree. Evaluation component 204 can then determine whether the resources called for in the job request are less than or equal to the available resources, and if so, then the job request is admissible on the quota tree.

Logical operations component 306 can apply logical operations on the admissibility outcomes of the one or more quota trees. For example, after evaluation component 204 has determined admissibility of the job request on the one or more quota trees, then evaluation component 204 can pass the admissibility determinations to logical operations component 306. Logical operations component 306 can also receive one or more logical operations, such as AND, OR, and/or any other type of logical condition or operator, as part of the job request. Logical operations component 306 can then determine admissibility of the job request based on the admissibility determination for the one or more quota trees and the received logical operator. For example, an AND operator calls for all of the one or more quota trees to determine the job request as admissible. In another example, an OR operator calls for at least one of the one or more quota trees to determine the job request as admissible. In further example, the received logical operator can specify that no more than one of the quota trees can determine the job request as inadmissible. In an embodiment, logical operations component 306 can apply logical operations in parallel with evaluation component 204 evaluating job request admissibility using the one or more quota trees. For example, after evaluation component 204 determines admissibility of the job request using a first quota tree of the one or more quota trees, evaluation component 204 can pass the admissibility result to logical operations component 306 and then proceed with determining admissibility of the job request using a second quota tree of the one or more quota trees. If the admissibility result is non-admissible and the logical operation is an AND type, then logical operations component 306 can signal evaluation component to stop evaluating the admissibility of the job request using the one or more quota trees, as an AND operator calls for the job request to be admissible for all the quota trees for overall admissibility. If the result is admissible and the logical operation is an OR type, then logical operations component 306 can signal evaluation component 204 to stop evaluating the admissibility of the job request using the one or more quota trees as an OR operator calls for the job request to be admissible for one or more of the quota trees for overall admissibility.

Arrangement component 307 can arrange the one or more quota trees in an order for evaluation that optimizes performance of the evaluation. In an embodiment, the one or more quota trees can be arranged based on the logical operator. For example, if the logical operator is AND, then arrangement component 307 can arrange the trees in descending order of the likelihood of non-admissibility of the job request being evaluated. The rationale is that it will be more efficient to evaluate first based on quota trees that are more likely to reject the job, so that the evaluation will not continue to additional quota trees. If the condition type is OR, then arrangement component 307 can arrange the quota trees for evaluation in descending order of admissibility of the job request being evaluated. The rational is that it will be more efficient to evaluate first based on quota trees that are more likely to accept the job request, so that the evaluation does not continue to additional quota trees. Arrangement component 307 can determine likelihood of admissibility of a quota tree based on global metrics of the quota trees, such as the load of the quota tree in terms of existing consumption and based on the resource requirements of the job request. Global metrics of a tree can be maintained and modified with every operation on the quota trees. In an embodiment, approximated metrics can be used. In an embodiment, arrangement component 307 can arrange the one or more quota trees prior to evaluation. For example, arrangement component 307 can arrange the one or more quota trees before they are passed to evaluation component 204 and/or logical operations component 306 for a determination on job request admissibility.

Mapping component 305 can map the job request to one or more leaf nodes in one or more quota trees. For example, mapping component 305 can first determine the one or more quota trees that apply to the job request. Mapping component 305 can make this determination based on characteristics of the job request such as resource requirements, the user who initiated the job request, the service making the job request, etc. Mapping component 305 can then map the job request to one or more nodes in the one or more quota trees. For example, if the user related to the job request belongs to a particular group, then mapping component 305 can identify the quota tree pertaining to the hierarchy related to the particular group and map the job request to the node in the quota tree representing the user.

Scheduling component 308 can perform a scheduling decision for the job request. In an embodiment, scheduling decisions can be performed on a hierarchy, from a global scheduling decision to the most specific scheduling decision. For example, a first scheduling decision can be made by scheduling component 308 on which cluster of resources to send the job request to, and a second scheduling decision can be made on which host groups or host or specific resources are assigned to the job request in the cluster. For each scheduling decision, scheduling component 308 can consider the job request's requirements and properties, and the current available and allocated resources in the scope within which each scheduling decision is made. The scheduling decision can then be passed to mapping component 305 to determine the one or more quota trees that apply to the job request. For example, mapping component 305 can map the job request to all quota trees that apply to the clusters, host groups, and/or resource groups that the job request was scheduled to by scheduling component 308.

FIG. 4 illustrates a flow diagram of an example, non-limiting computer-implemented method 400 that can facilitate usage of multiple quota trees in resource scheduling in accordance with one or more embodiments described herein. Repetitive description of like elements and/or processes employed in respective embodiments is omitted for sake of brevity.

At 410, computer-implemented method 400 can comprise evaluating, by a system (e.g., resource scheduling system 201 and/or evaluation component 204) operatively coupled to a processor (e.g., processor 203), an incoming job request before any scheduling decisions using all quota trees with global scope. For example, as described above in reference to FIGS. 2 and 3, mapping component 305 can map the job request to one or more nodes in one or more global quota trees. In an embodiment, after mapping by mapping component 305, arrangement component can arrange the one or more global quota trees the job request was mapped, to optimize performance of the evaluation by evaluation component 204. After evaluation of the one or more global quota trees by evaluation component 204, logical operations component 306 can apply logical operations on the admissibility outcomes of the one or more quota trees to determine overall admissibility of the job request based on global quota trees.

At 420, computer-implemented method 400 can comprise determining, by the system (e.g., resource scheduling system 201 and/or scheduling component 308) if additional scheduling decisions are required. As described above in reference to FIGS. 2 and 3, scheduling component 308 can perform scheduling iteratively based on a hierarchy, working from a global scope scheduling, such as what resource cluster to send a job request to, to the most specific scheduling decision, such as what specific resources in the cluster are assigned to the job request. As such, if scheduling component 308 has performed a scheduling decision at the most specific level called for by the job request, then computer-implemented method 400 can proceed to step 460. If additional scheduling decisions are called for, then computer-implemented method 400 can proceed to step 430.

At 430, computer-implemented method 400 can comprise performing, by the system (e.g., resource scheduling system 201 and/or scheduling component 308) a scheduling decision for the current scheduling level. For example, scheduling component 308 can consider the resources the job request calls for and the properties of the job request as well as the currently available and allocated resources in the scope within which the scheduling decision is being made. For example, if the scheduling decision comprise a determination of what resource cluster to send the job request to, scheduling component 308 can consider the available and allocated resources of the resource clusters. Additionally, scheduling component 308 can take into account information on which quota trees were satisfied and which were not satisfied at previous iterations of the scheduling process.

At 440, computer-implemented method 400 can comprise determining, by the system (e.g., resource scheduling system 201 and/or mapping component 305), a set of scoped quota trees that apply to the job request based on the scheduling decision. For example, if the scheduling decision at 430 comprises scheduling the job request to a particular host group, mapping component 305 can map the job request to one or more leaf nodes in one or more quota trees that apply to the particular host group.

At 450, computer-implemented method 400 can comprise evaluating, by the system (e.g., resource scheduling system 201 and/or evaluation component 204), the incoming job request using the set of scoped quota trees. For example, evaluation of admissibility of the job request using the scoped quota trees can comprise the same steps as evaluation of the job request using the global quota trees. As such, arrangement component 307 can arrange the one or more scoped quota trees the job request was mapped to in order to optimize performance of the evaluation. Evaluation component 204 can then evaluate admissibility of the job request using the one or more scoped quota trees, and logical operations component 306 can apply logical operations on the admissibility outcome of the scoped quota trees to determine an overall admissibility for that scope.

At 460, computer-implemented method 400 can comprise determining, by the system (e.g., resource scheduling system 201 and/or evaluation component 204) if the overall evaluation determines the job request as admissible. For example, evaluation component 204 can consider the admissibility outcome over each level of the scheduling process. As such, evaluation component can consider the admissibility result produced by logical operations component 306 at step 410 for the global quota trees and the admissibility result produced by logical operations component 306 at each iteration of step 450. In an embodiment, if all the admissibility results were positive, then computer-implemented method 400 can proceed to step 470. If one or more of the admissibility results were negative, then computer-implemented method 400 can proceed to step 480. In another embodiment, logical operations component 306 can apply logical operations on the admissibility outcomes of each level of the scheduling process in the same manner as applying logical operations to the admissibility outcomes of quota trees as described in reference to FIGS. 2 and 3.

At 470, computer implemented method 400 can comprise applying, by the system (e.g., resource scheduling system 201 and/or scheduling component 308) changes to the relevant quota trees based on the resources called for by the job request and admission of the job request. For example, scheduling component 308 can update the resource usage values of the quota trees the job request was mapped to during the scheduling process in order to reflect the resources the job request calls for in future scheduling decisions for other job requests. The job request can then be admitted for execution by the scheduled resources.

At 480, computer-implemented method 400 can comprise reverting, by the system (e.g., resource scheduling system 201 and/or scheduling component 308) any changes that were made to one or more quota trees to reflect the called for resources of the job request. The job request can then be passed to an optimization system (not shown) which can apply one or more optimization operations to enable admissibility of the job request.

Figure 5:
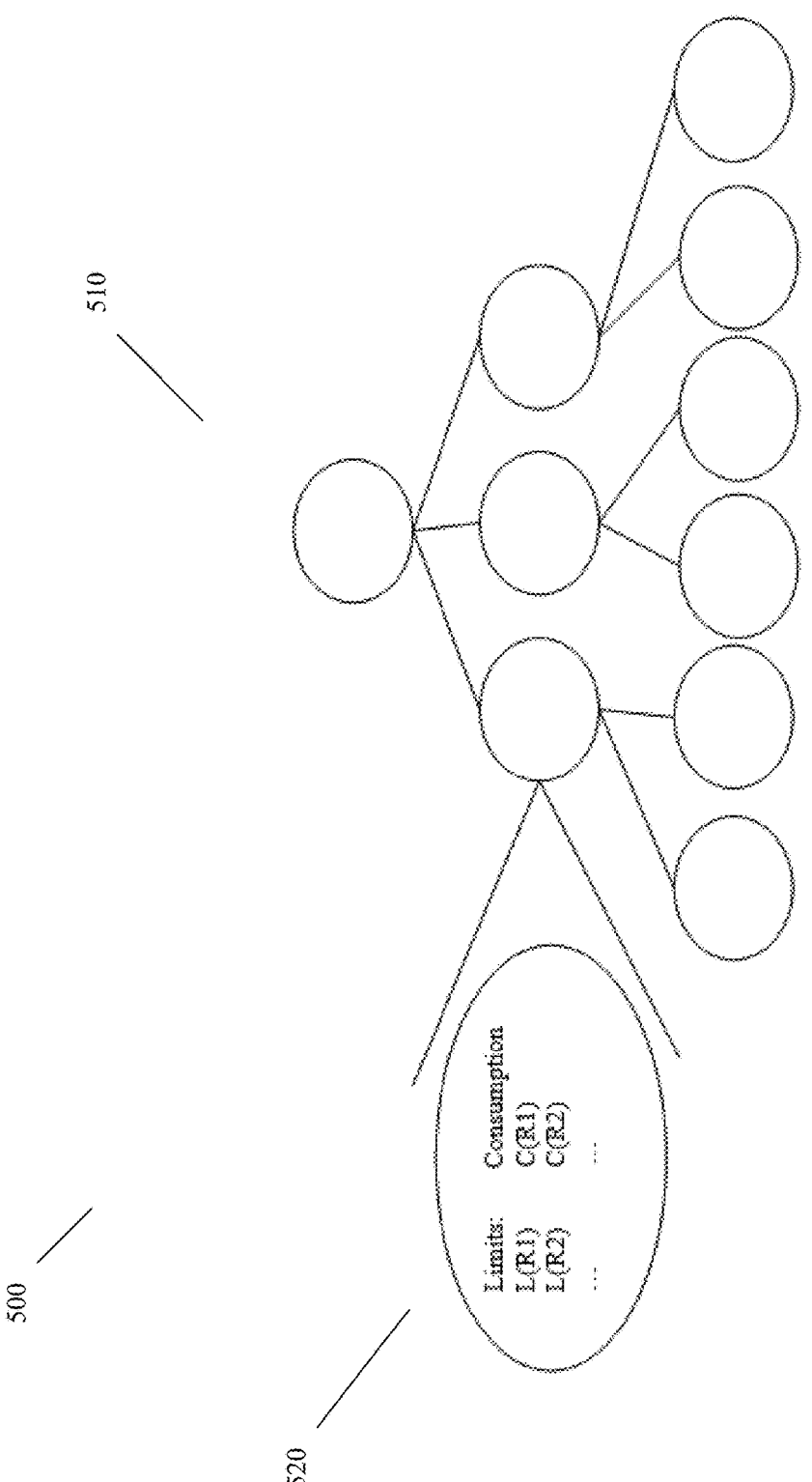
FIG. 5 illustrates a diagram representation of an example, non-limiting single quota tree in accordance with one or more embodiments described herein.

FIG. 5 illustrates a diagram 500 representation of an example, non-limiting single quota tree in accordance with one or more embodiments described herein. Repetitive description of like elements and/or processes employed in respective embodiments is omitted for sake of brevity.

Diagram 500 comprises quota tree 510 which comprises multiple nodes, such as node 520. Quota tree 510 can be a representation of quota specification with the following properties. Each node of quota tree 510 can specify quota limits for a set of resources $R_1$ through $R_n$ (e.g., computer processing unit (CPU), graphical processing unit (GPU), memory, storage, etc.), denoted as $L(R_1)$ through $L(R_n)$ and can track actual consumption for each of these resources, denoted as $C(R_1)$ through $C(R_n)$. For example, node 520 contains limits for resources $R_1$ and $R_2$ ($L(R_1)$ and $L(R_2)$)

and actual consumption ($C(R_1)$ and $C(R_2)$). Quota tree 510 can express a hierarchy, using the tree structure, in which the aggregated limit values and aggregated actual consumption values specified for all the direct descendent nodes of a parent node do not exceed the limit values and actual consumption values specified for the parent node. Additionally, quota tree 510 can have properties that pertain to the entire tree. For example, quota tree 510 can have a scope property that specifies if the tree is applicable globally, or otherwise applicable to specific clusters, or to specific groups of hosts within one or more clusters. Quota tree 510 can also have any additional properties.

A job request can be mapped to multiple leaves within quota tree 510. For example, if quota tree 510 represents an organizational hierarchy, a job request may be owned jointly by multiple users, where each user is represented by a separate leaf node in quota tree 510. In another example, if quota tree 510 represents a computer services hierarchy, a job request may consume resources from multiple services, wherein each resource is represented by a separate leaf node in quota tree 510. The consumption of resources a job request calls for can be different with respect to each leaf node in quota tree 510 that it maps to. For example, a job request that is jointly owned by users U1 and U2 may apply for example with 60% proportion to the quotas of U1 and with 40% proportion to the quotas of U2. For example, mapping component 305 can produce a set of nodes and associated proportions that a job request maps to in a quota tree using the function MapQuotaNodes[Job, QuotaTree]={ (Leaf$_i$, Proportions)}. Combining the resource usage per resource of the job request with a specific proportion yields the resource usage per resource that should be applied to that specific node and its associated path.

A job request is admissible with respect to quota tree 510 if the job request is admissible with respect to all the paths from the nodes the job request maps to, to the root of the tree. The job request is admissible with respect to a specific path in a quota tree if adding the resource consumption of the job request, for all the resources, calculated (using the associated proportion) for the node of this path to all the nodes on the path from the node to the root does not exceed the limits specified on all the nodes in the path. Namely, this is an AND operation on all the paths in quota tree 510 that the job request maps to. The limits specified for each resource in each node in quota tree 510 can be hard limits or soft limits. If the limit is soft, then it can be exceeded, however other implications may take effect, for example, only a limited number of job requests can exceed the soft limit, warnings can be issued, etc. If the limit is hard, then it cannot be exceeded. If a job request is admissible, its resource consumptions are added to all the nodes on all the paths from the nodes the job request maps to in quota tree 510.

Figure 6:
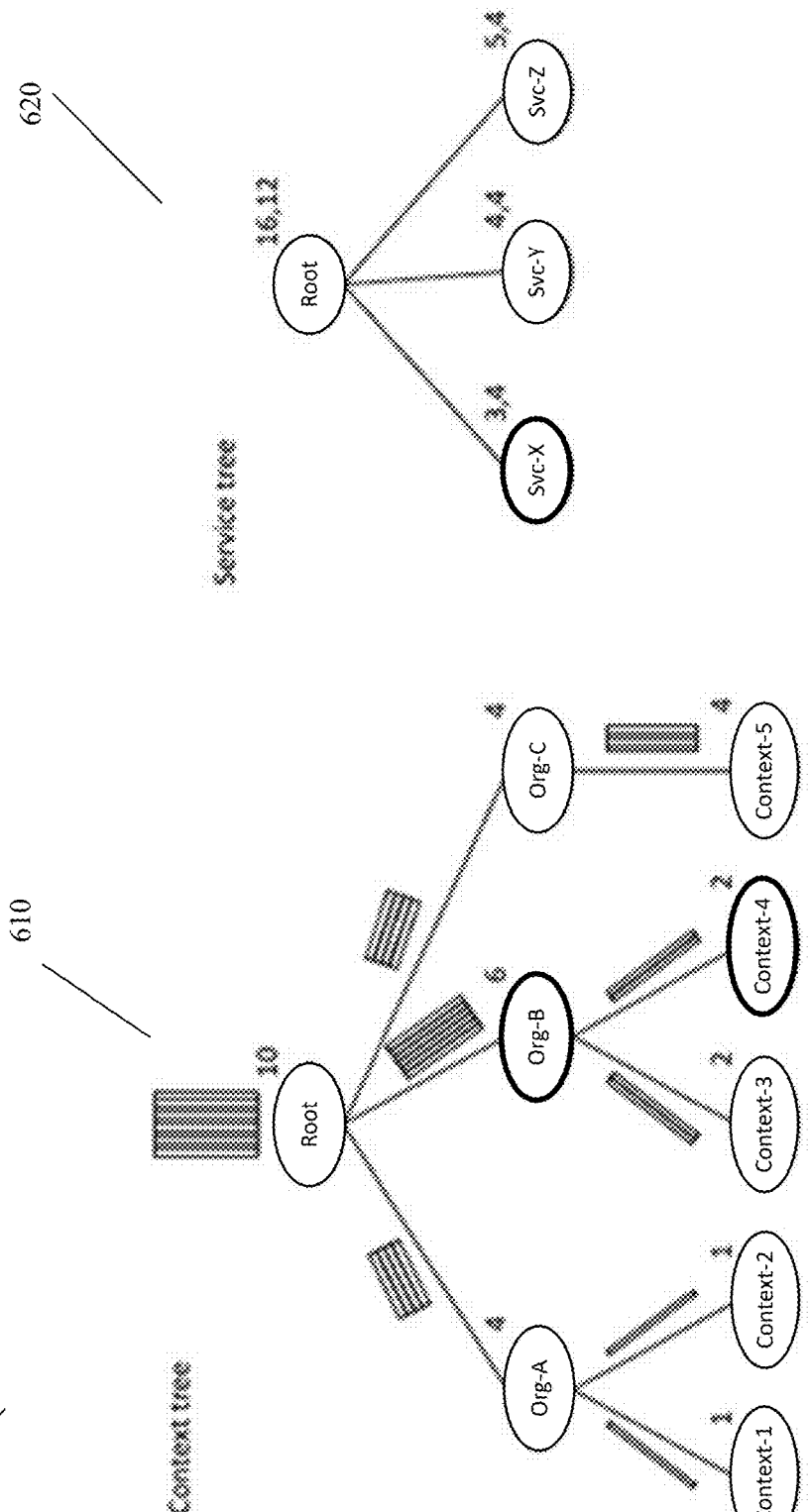
FIG. 6 illustrates a diagram representation of example, non-limiting multiple quota trees in accordance with one or more embodiments described herein.

FIG. 6 illustrates a diagram 600 representation of example, non-limiting multiple quota trees in accordance with one or more embodiments described herein. Repetitive description of like elements and/or processes employed in respective embodiments is omitted for sake of brevity.

Diagram 600 comprise two quota trees, context tree 610 and service tree 620. Context tree 610 represents an organizational structure while service tree 620 represents various services. Before scheduling component 308 performs any scheduling decision, an incoming job request can be evaluated on all quota trees with a global scope property. For example, if either of context tree 610 or service tree 620 have a global scope property, then mapping component 305 can map the job request to a quota tree using the function MapQuotaTrees[job, (scope=global)]={set of global quota trees}. Evaluation component 204 can then perform an evaluation using the function Evaluate[job, {set of global quota trees}, conditionType]=admissible|not-admissible, which evaluates the admissibility for each quota tree in the set of global quota trees in the same manner as described above in reference to FIG. 5 for a single quota tree. Logical operations component 306 can then apply logical operations for the admissibility outcomes for the quota trees in the set of global quota trees. For example, context tree 610 and service tree 620 can both have a global scope and a job request can be evaluated as admissible based on context tree 610 by evaluation component 204 and the job request can be evaluated as non-admissible based on service tree 620. As such, if logical operations component 306 applies an AND operator for the admissibility outcomes of context tree 610 and service tree 620, the overall admissibility will be non-admissible since the job request was evaluated as non-admissible based on service tree 620. If logical operations component 306 applies an OR operator to the admissibility outcomes of context tree 610 and service tree 620, then the overall admissibility outcome would be admissible since the job request was evaluated as admissible based on at least one of the two trees.

Following a determination of global admissibility, scheduling component 308 can begin iterative scheduling for the job request. For example, depending on the scheduling level and the scope of context tree 610 and service tree 620, mapping component 305 can map the job request to one or more nodes in context tree 610 and/or service tree 620 based on whether context tree 610 and/or service tree 620 apply to that iteration of the scheduling process as described above in reference to FIGS. 2, 3, and 4. For example, mapping component 305 can map the job request to a quota tree using the function MapQuotaTrees[job, (scope=scheduling-decision)]={set of local quota trees}. Depending on the mapping, evaluation component 204 can evaluate the admissibility of a job request based on context tree 610 and service tree 620, and logical operations component 306 can apply logical operations on the admissibility outcomes from context tree 610 and service tree 620. This process can continue for each iteration of scheduling performed by scheduling component 308 and then overall admissibility can be determined by evaluation component 204 and/or logical operations component 306 based on the global scope admissibility outcome and the admissibility outcome at each iteration of the scheduling process.

Figure 7:
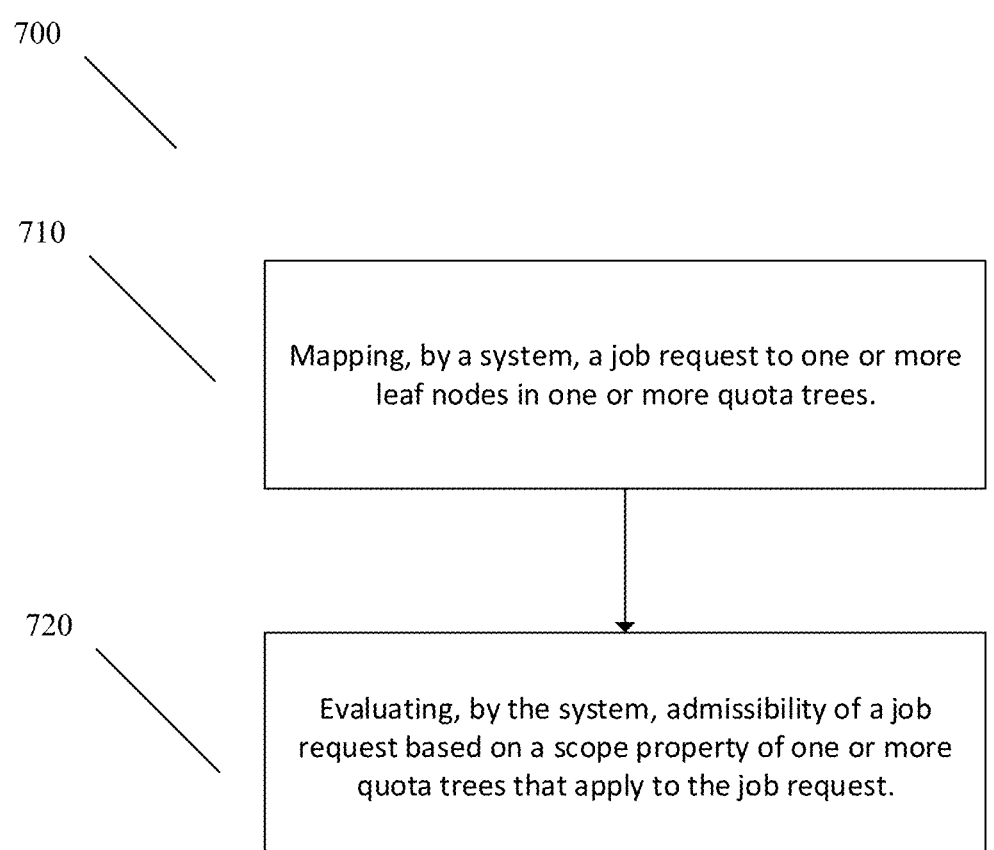
FIG. 7 illustrates a flow diagram of an example, non-limiting computer-implemented method that can facilitate usage of multiple quota trees in resource scheduling in accordance with one or more embodiments described herein.

FIG. 7 illustrates a flow diagram of an example, non-limiting computer-implemented method 700 that can facilitate usage of multiple quota trees in resource scheduling in accordance with one or more embodiments described herein. Repetitive description of like elements and/or processes employed in respective embodiments is omitted for sake of brevity.

At 710, computer-implemented method 700 can comprise mapping, by a system (e.g., resource scheduling system 201 and/or mapping component 305) operatively coupled to a processor (e.g., processor 203), a job request to one or more leaf nodes in one or more quota trees.

At 720, computer-implemented method 700 can comprise evaluating, by the system (e.g., resource scheduling system 201 and/or evaluation component 204), admissibility of a job request based on a scope property of one or more quota trees that apply to the job request. For example, a job request is admissible with respect to a quota tree if adding the resource consumption of the job request, for all the resources within the quota tree, to all the nodes on the path from the leaf node the job request is mapped on to the root of the quota tree does not exceed the limits of specified on all nodes on the path.

FIG. 8 illustrates a flow diagram of an example, non-limiting computer-implemented method 800 that can facilitate usage of multiple quota trees in resource scheduling in accordance with one or more embodiments described herein. Repetitive description of like elements and/or processes employed in respective embodiments is omitted for sake of brevity.

At 810, computer-implemented method 800 can comprise mapping, by a system (e.g., resource scheduling system 201 and/or mapping component 305) operatively coupled to a processor (e.g., processor 203), a job request to one or more leaf nodes in one or more quota trees.

At 820, computer-implemented method 800 can comprise arranging, by the system (e.g., resource scheduling system 201 and/or arrangement component 307), the one or more quota trees in an order that optimizes performance of the evaluation. For example, if the logical operator is an AND, arrangement component 307 can arrange the quota trees in descending order of likelihood for evaluating the job request as inadmissible. If the logical operator is an OR, arrangement component 307 can arrange the quota tees in descending order of likelihood for evaluating the job request as admissible.

At 830, computer-implemented method 800 can comprise evaluating, by the system (e.g., resource scheduling system 201 and/or evaluation component 204), admissibility of a job request based on a scope property of one or more quota trees that apply to the job request. For example, a job request is admissible with respect to a quota tree if adding the resource consumption of the job request, for all the resources within the quota tree, to all the nodes on the path from the leaf node the job request is mapped on to the root of the quota tree does not exceed the limits specified on all nodes on the path.

At 840, computer-implemented method 800 can comprise applying, by the system (e.g., resource scheduling system 201 and/or logical operations component 306), logical operations on the admissibility outcomes of the one or more quota trees.

Resource scheduling system 201 can provide technological improvements to systems, devices, component, operation steps, and/or processing steps associated with resource scheduling. For example, resource scheduling system 201 can evaluate admissibility of one or more quota trees based on a scope property of the one or more quota trees, thereby enabling multiple quota trees, and thus multiple hierarchies, to be considered as part of a resource scheduling process.

Resource scheduling system 201 can provide technical improvements to a processing unit associated with resource scheduling system 201. For example, in arranging the one or more quota trees in an order that optimizes evaluation of admissibility, resource scheduling system 201 can determine overall admissibility of a job request based on one or more quota trees using a logical operator without evaluating all the individual admissibility for each of the one or more quota trees, thereby reducing the workload of a processing unit (e.g., processor 203) that is employed to execute the routines (e.g., instructions and/or processing threads) involved in resource scheduling. In this example, by reducing the workload of such a processing unit (e.g., processor 203), resource scheduling system 201 can thereby facilitate improved performance, improved efficiency, and/or reduced computational cost associated with such a processing unit.

A practical application of resource scheduling system 201 is that it allows for a resource scheduling system that can consider multiple quota trees, and thus multiple hierarchies, allowing for a more specific and granular scheduling of resource usage.

Resource scheduling system 201 can employ hardware and/or software to solve problems that are highly technical in nature, that are not abstract and that cannot be performed as a set of mental acts by a human. In some embodiments, one or more of the processed described herein can be performed by one or more specialized computers (e.g., a specialized processing unit, a specialized classical computer, a specialized quantum computer, and/or another type of specialized computer) to execute defined tasks related to the various technologies identified above. Resource scheduling system 201 and/or components thereof, can be employed to solve new problems that arise through advancements in technologies mentioned above, employment of quantum computing systems, cloud computing systems, computer architecture, and/or another technology.

It is to be appreciated that resource scheduling system 201 can utilize various combinations of electrical components, mechanical components, and circuitry that cannot be replicated in the mind of a human or performed by a human as the various operations that can be executed by resource scheduling system 201 and/or components thereof as described herein are operations that are greater than the capability of a human mind. For instance, the amount of data processed, the speed of processing such data, or the types of data processed by resource scheduling system 201 over a certain period of time can be greater, faster, or different that the amount, speed, or data type that can be processed by a human mind over the same period of time.

According to several embodiments, resource scheduling system 201 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that resource scheduling system 201 can include information that is impossible to obtain manually by an entity, such as a human user. For example, the type, amount, and/or variety of information included in resource scheduling system 201, evaluation component 204, mapping component 305, logical operations component 306, and/or arrangement component 307 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 9:
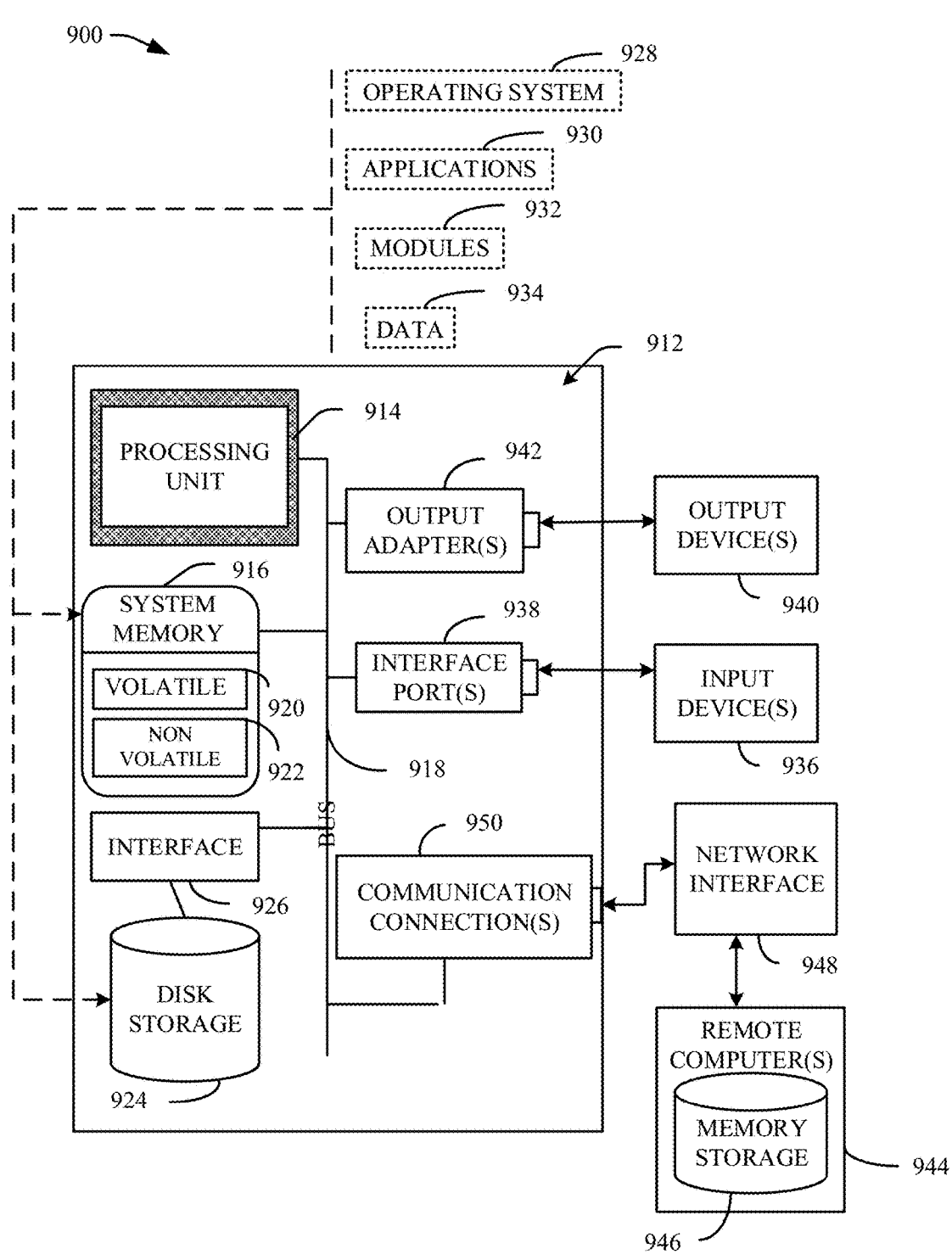
FIG. 9 illustrates a block diagram of an example, non-limiting operating environment in which one or more embodiments described herein can be facilitated.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Figure 10:
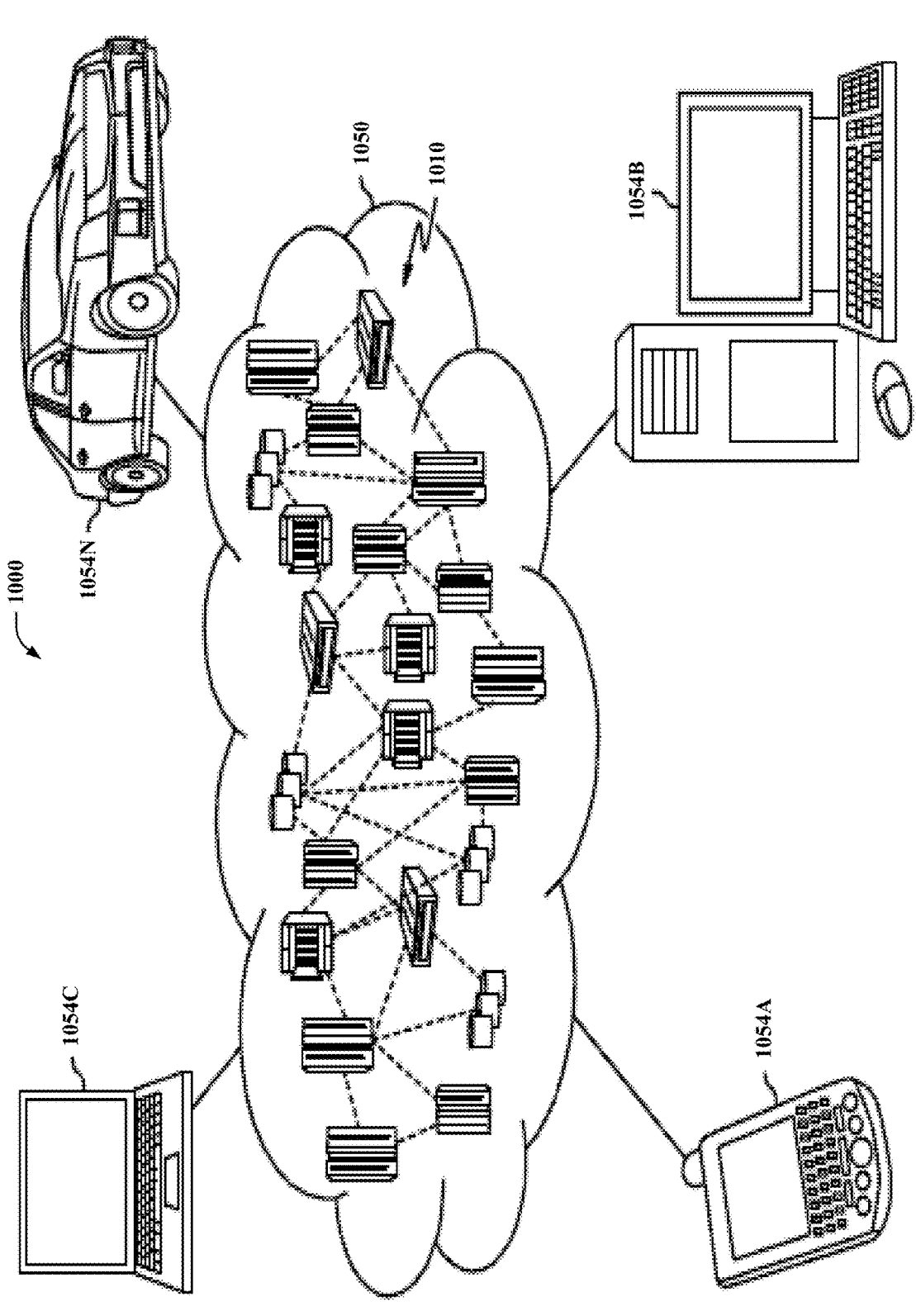
FIG. 10 illustrates a block diagram of an example, non-limiting cloud computing environment in accordance with one or more embodiments of the subject disclosure.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Although not illustrated in FIG. 10, cloud computing nodes 1010 can further comprise a quantum platform (e.g., quantum computer, quantum hardware, quantum software, and/or another quantum platform) with which local computing devices used by cloud consumers can communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

with regard to two or more quota trees that are able to be applicable to a job request, arranging, by a system operatively coupled to a processor, respective quota trees of the two or more quota trees in an evaluation order based on a logical operator associated with the job request and respective likelihoods of admissibility of the respective quota trees for the job request, wherein the respective quota trees comprise a first quota tree and a second quota tree;

evaluating, by the system, admissibility of the job request with respect to the two or more quota trees based on the evaluation order and a scope property of the two or more quota trees, wherein the evaluating comprises simultaneously evaluating the first quota tree and the second quota tree, wherein the first quota tree comprises first nodes that are arranged in a computer-resource hierarchy and represent computer-type resources, and the second quota tree comprises second nodes that are arranged in an organizational hierarchy and represent non-computer-type resources, wherein the second quota tree is not part of the first quota tree, wherein the computer-type resources comprise computer processing resources, computer memory resources, or computer data storage resources that potentially are applicable to the job request, wherein the non-computer-type resources comprise users, user groups, funding units, or projects of an organization that potentially are applicable to the job request, wherein the non-computer-type resources do not include any computer-type resources, and wherein the arranging and the evaluating comprises determining which resources of the two or more quota trees are able to execute the job request such that resource usage remains within quota limits associated with the two or more quota trees; and scheduling, by the system, the job request to the resources associated with at least two quota trees of the two or more quota trees that are determined to be able to satisfy the job request based on a result of the evaluating of the admissibility of the job request, wherein a job is executed, utilizing the resources, based on the job request and the scheduling.

2. The computer-implemented method of claim 1, wherein the at least two quota trees of the two or more quota trees are selected based on a scheduling process.

3. The computer-implemented method of claim 1, wherein the at least two quota trees of the two or more quota trees are selected based on a global scope property.

4. The computer-implemented method of claim 1, further comprising:

mapping, by the system, the job request to one or more leaf nodes in the two or more quota trees, wherein the one or more leaf nodes comprise one or more of the first nodes or one or more of the second nodes.

5. The computer-implemented method of claim 2, wherein the scheduling process is based on resource requirements associated with the job request and available resources, and wherein the available resources comprise available computer-type resources and available non-computer-type resources.

6. The computer-implemented method of claim 1, further comprising:

applying, by the system, logical operations on the admissibility outcome of the job request based on the two or more quota trees.

7. The computer-implemented method of claim 1, wherein the logical operator is a first logical operator or a second logical operator, wherein the evaluation order is a first evaluation order or a second evaluation order, and wherein the arranging further comprises:

arranging the respective quota trees in the first evaluation order, based on the first logical operator, or in the second evaluation order, based on the second logical operator, wherein the first evaluation order is a descending order of admissibility of the respective quota trees from a higher likelihood of admissibility to a lower likelihood of admissibility, and wherein the second evaluation order is a descending order of non-admissibility of the respective quota trees from a higher likelihood of non-admissibility to a lower likelihood of non-admissibility.

8. A system, comprising:

a memory that stores computer executable components; and a processor that executes computer executable components stored in memory, wherein the computer executable components comprise:

an arrangement component, wherein, with regard to two or more quota trees that are able to be applicable to a job request, the arrangement component arranges respective quota trees of the two or more quota trees in an evaluation order based on a logical operator associated with the job request and respective likelihoods of admissibility of the respective quota trees for the job request, wherein the respective quota trees comprise a first quota tree and a second quota tree;

an evaluation component that evaluates admissibility of the job request with respect to the two or more quota trees based on the evaluation order and a scope property of the two or more quota trees, wherein the evaluation component concurrently evaluates the first quota tree and the second quota tree, wherein the first quota tree comprises first nodes that are arranged in a computer-resource hierarchy and represent computer-type resources, and the second quota tree comprises second nodes that are arranged in an organizational hierarchy and represent non-computer- type resources, wherein the second quota tree is separate from the first quota tree, wherein the computer-type resources comprise computer processing resources, memory resources, or data storage resources that potentially are applicable to the job request, wherein the non-computer-type resources comprise users, user groups, funding units, or projects of an organization that potentially are applicable to the job request, and wherein the arrangement of the respective quota trees and the evaluation of the admissibility of the job request comprises a determination of which resources of the two or more quota trees are able to perform the job request such that resource usage remains within quota limits associated with the two or more quota trees; and a scheduling component that determines a schedule that assigns, to the job request, the resources associated with at least two quota trees of the two or more quota trees that are determined to be able to satisfy the job request based on a result of the evaluation of the admissibility of the job request, wherein a job is performed, utilizing the resources, based on the job request and the schedule.

9. The system of claim 8, wherein the at least two quota trees of the two or more quota trees are selected based on a scheduling process.

10. The system of claim 8, wherein the at least two quota trees of the two or more quota trees are selected based on a global scope property.

11. The system of claim 8, wherein the computer executable components further comprise:

a mapping component that maps the job request to one or more leaf nodes in the two or more quota trees, wherein the one or more leaf nodes comprise one or more of the first nodes or one or more of the second nodes.

12. The system of claim 9, wherein the scheduling process is based on resource usage associated with the job request and available resources, and wherein the available resources comprise available computer-type resources and available non-computer-type resources.

13. The system of claim 8, wherein the computer executable components further comprise:

a logical operations component that applies logical operations on the admissibility outcomes of the two or more quota trees.

14. The system of claim 8, wherein the arrangement component arranges the two or more quota trees in the evaluation order that enhances performance of the evaluation and reduces the workload of the processor and computational costs associated with the processor.

15. A computer program product comprising a computer readable storage medium having program instructions embodied therewith, the program instructions executable by a processor to cause the processor to:

with regard to two or more quota trees that are able to be applicable to a job request, arrange respective quota trees of the two or more quota trees in an order based on a logical operator associated with the job request and respective likelihoods of admissibility of the respective quota trees for the job request, wherein the respective quota trees comprise a first quota tree and a second quota tree;

evaluate admissibility of the job request with respect to the two or more quota trees based on the order and a scope property of the two or more quota trees, wherein the evaluating comprises evaluate, in parallel, the first quota tree and the second quota tree, wherein the first quota tree comprises first nodes that are arranged in a computer-resource hierarchy and represent computer-type resources, and the second quota tree comprises second nodes that are arranged in an organizational hierarchy and represent non-computer-type resources, wherein the second quota tree is not part of the first quota tree, wherein the computer-type resources comprise computer processing resources, memory resources, or data storage resources that potentially are applicable to the job request, wherein the non-computer-type resources comprise users, user groups, funding units, or projects of an organization that potentially are applicable to the job request, and wherein the arranging and the evaluating comprises determining which resources of the two or more quota trees are able to perform the job request such that resource usage remains within quota limits associated with the two or more quota trees; and schedule the job request to the resources associated with at least two quota trees of the two or more quota trees that are determined to be able to satisfy the job request based on a result of the evaluation of the admissibility of the job request, wherein a job is performed, utilizing the resources, based on the job request and the scheduling.

16. The computer program product of claim 15, wherein the at least two quota trees of the two or more quota trees are selected based on a scheduling process.

17. The computer program product of claim 15, wherein the at least two quota trees of the two or more quota trees are selected based on a global scope property.

18. The computer program product of claim 15, wherein the program instructions are further executable by the processor to cause the processor to:

map the job request to one or more leaf nodes in the two or more quota trees, wherein the one or more leaf nodes comprise one or more of the first nodes or one or more of the second nodes.

19. The computer program product of claim 15, wherein the program instructions are further executable by the processor to cause the processor to:

apply logical operations on the admissibility outcome of the two or more quota trees.

20. The computer program product of claim 15, wherein the program instructions are further executable by the processor to cause the processor to:

arrange the two or more quota trees in the order that optimizes performance of the evaluation.

* * * * *